US011006484B2

(12) United States Patent
Dong et al.

(10) Patent No.: US 11,006,484 B2
(45) Date of Patent: *May 11, 2021

(54) SHIELDED FLUOROPOLYMER WIRE FOR HIGH TEMPERATURE SKIN EFFECT TRACE HEATING

(71) Applicant: nVent Services GmbH, Schaffhausen (CH)

(72) Inventors: Wesley Dong, Belmont, CA (US); Paul Becker, San Carlos, CA (US); David Parman, San Ramon, CA (US)

(73) Assignee: nVent Services GmbH, Schaffhausen (CH)

( * ) Notice: Subject to any disclaimer, the term of this patent is extended or adjusted under 35 U.S.C. 154(b) by 369 days.

This patent is subject to a terminal disclaimer.

(21) Appl. No.: 15/902,804

(22) Filed: Feb. 22, 2018

(65) Prior Publication Data

US 2018/0184487 A1    Jun. 28, 2018

Related U.S. Application Data

(63) Continuation-in-part of application No. 15/591,949, filed on May 10, 2017.

(Continued)

(51) Int. Cl.
*H05B 3/56* (2006.01)
*C08L 101/04* (2006.01)
(Continued)

(52) U.S. Cl.
CPC .............. *H05B 3/56* (2013.01); *C08L 101/00* (2013.01); *C08L 101/04* (2013.01); *F16L 53/34* (2018.01);
(Continued)

(58) Field of Classification Search
CPC ...... H05B 3/56; H05B 3/00; H05B 2203/021; H05B 3/36; H05B 2214/02; H05B 3/0004;
(Continued)

(56) References Cited

U.S. PATENT DOCUMENTS

| | | | |
|---|---|---|---|
| 3,259,688 A * | 7/1966 | Towne | H01B 9/027 174/107 |
| 3,433,891 A | 3/1969 | Zysk et al. | |

(Continued)

FOREIGN PATENT DOCUMENTS

| | | |
|---|---|---|
| CN | 1571075 A | 1/2005 |
| DE | 102008021204 A1 | 11/2009 |
| JP | 2002109970 A | 4/2002 |

OTHER PUBLICATIONS

Polyfluor's non-patent literatures to "Fillers in PTFE", 2015 (Year: 2015).*

*Primary Examiner* — Phuong T Nguyen
*Assistant Examiner* — Bonita Khlok
(74) *Attorney, Agent, or Firm* — Quarles and Brady LLP

(57) ABSTRACT

A skin effect heating system for long pipelines includes a heater cable disposed in a ferromagnetic or other conductive heat tube. A semiconductive jacket contacts the inner surface of the heat tube, where the charge density of the return current carried by the heat tube is at its highest. The semiconductive jacket material has a resistivity that is sufficiently low to reduce or eliminate arcing events such as corona discharge by allowing accumulated charge on the heat tube to dissipate. The resistivity is also high enough to prevent the return current from flowing into or through the semiconductive outer layer, so that heat production capacity of the system is maximized.

18 Claims, 4 Drawing Sheets

Related U.S. Application Data

(60) Provisional application No. 62/334,346, filed on May 10, 2016.

(51) Int. Cl.
 *F16L 53/34* (2018.01)
 *H01B 7/42* (2006.01)
 *H05B 3/00* (2006.01)
 *H05B 3/14* (2006.01)
 *C08L 101/00* (2006.01)
 *F16L 53/38* (2018.01)

(52) U.S. Cl.
 CPC ........... *H01B 7/428* (2013.01); *H05B 3/0004* (2013.01); *H05B 3/145* (2013.01); *F16L 53/38* (2018.01)

(58) Field of Classification Search
 CPC ........ H05B 2214/03; H05B 3/42; H05B 3/78; H01B 7/02; H01B 7/17; H01B 7/428; F16L 53/34; F16L 53/38
 USPC ....... 392/469, 311, 465, 466, 468, 301, 302, 392/478–482, 485–490; 219/544, 546, 219/548, 552–553
 See application file for complete search history.

(56) References Cited

U.S. PATENT DOCUMENTS

| | | |
|---|---|---|
| 3,643,004 A * | 2/1972 | McKean ............... H01B 9/027 174/36 |
| 3,718,804 A | 2/1973 | Ando |
| 3,748,369 A | 7/1973 | Durakis et al. |
| 3,769,085 A | 10/1973 | Matsubara |
| 3,793,716 A | 2/1974 | Smith |
| 3,878,319 A | 4/1975 | Wahl |
| 4,109,098 A | 8/1978 | Olsson et al. |
| 4,436,565 A | 3/1984 | Weitzel et al. |
| 4,532,375 A | 7/1985 | Weitzel et al. |
| 4,560,524 A | 12/1985 | Smuckler |
| 4,617,449 A * | 10/1986 | Weitzel ............... H05B 3/0004 174/88 R |
| 4,629,869 A | 12/1986 | Bronnvall |
| 4,687,882 A | 8/1987 | Stone et al. |
| 4,780,576 A | 10/1988 | Kuno |
| 5,206,485 A | 4/1993 | Srubas et al. |
| 5,300,733 A | 4/1994 | Uematsu |
| 8,559,800 B2 | 10/2013 | Ellis et al. |
| 8,696,939 B2 | 4/2014 | Negle |
| 8,939,207 B2 | 1/2015 | De St. Remey et al. |
| 2012/0037611 A1 | 2/2012 | Karlsen et al. |
| 2012/0205137 A1 | 8/2012 | Fjellner et al. |

\* cited by examiner

SHIELDED FLUOROPOLYMER WIRE FOR HIGH TEMPERATURE SKIN EFFECT TRACE HEATING

CROSS-REFERENCE TO RELATED APPLICATIONS

This application is a continuation-in-part and claims the benefit of U.S. patent application Ser. No. 15/591,949, entitled "Shielded Wire for High Voltage Skin Effect Trace Heating," filed May 10, 2017, which is a nonprovisional application claiming the benefit of priority from U.S. Prov. Pat. App. Ser. No. 62/334,346, filed under the same title on May 10, 2016, both of which patent applications are incorporated fully herein by reference.

BACKGROUND OF THE INVENTION

In the oil and gas industry, pipelines must be heated over distances of many miles. Skin effect electric heat tracing systems are ideally suited for long transfer pipelines up to 12 miles (20 km) per circuit. The system is engineered for the specific application. Applications for this system include material transfer lines, snow melting and de-icing, tank foundation heating, subsea transfer lines and prefabricated, pre-insulated lines. In a skin-effect heating system, heat is generated on the inner surface of a ferromagnetic heat tube that is thermally coupled to the pipe to be heat traced. An electrically insulated, temperature resistant conductor is installed inside the heat tube and connected to the tube at the far end. An alternating current (AC) is passed through the insulated conductor and returns through the heat tube.

In a traditional skin effect heating system, the core conductor of the heater cable sits inside an insulation layer. The heater cable is surrounded by air except at the point at which the insulating jacket contacts the inner surface of the heat tube. Partial discharge is caused by the charge differential between the surface of the insulation and the inner surface of the grounded heat tube, which carries the return AC in the opposite direction; the inner surface of the heat tube has the highest charge density, relative to the rest of the heat tube, due to the skin effect. Protracted partial discharge can erode solid insulation and eventually lead to breakdown of insulation at the point of contact. Protracted partial discharge also tends to initiate at defects (voids, imperfections, contaminants) in the insulation layer. It can also cause a corona effect, a localized discharge resulting from transient gaseous ionization on an insulation system when the voltage stress exceeds a critical value; inception in air at room temperature occurs at or about $3\times10^6$ V/m. An insulating material can have a maximum desirable amount of partial discharge: protracted partial discharge at or below this threshold may not be harmful to the material or the surroundings, but beyond the maximum, partial discharge begins to damage the material. The material can further have a maximum recommended operating voltage at which partial discharge from the material does not exceed the maximum desirable amount.

The ferromagnetic heat tube of a skin-effect heating system is prone to the corona effect as a charge difference builds up between the surface of the tube and the surface of the insulated conductor and exceeds the breakdown electric field for air ($3\times10^6$ V/m). This effect becomes a significant issue for longer pipelines that require a higher voltage potential to drive the current that also results in greater charge build up between the two surfaces. Partial discharge of the accumulated static electricity can damage or prematurely age the insulation and other components, and at high voltages (relative to rated voltages of the component materials) can discharge in arcing events. Thus, industry standards have developed to limit partial discharge. Heater cable component materials, particularly electrical insulation materials, are characterized by a rated voltage at which partial discharge from the material does not exceed 10 picoCoulombs. Notably, some materials can tolerate much more than 10 picoCoulombs (e.g., Silicone, at about 20 nanoCoulornbs), but must operate at the rated voltage in the field.

The rated voltages of materials used in the heater cables must therefore be considered in conjunction with other material advantages. For example, perfluoroalkoxy polymer (PFA) is an ideal electrical insulating material for higher temperature applications, such as sulfur transfer lines where the operating cable temperatures are around 135-140 deg C. PFA insulation is rated to 265 C and enables running at higher current densities than with lower temperature insulations such as high-density polyethylene (HDPE), ethylene propylene diene monomer (EPDM) rubber ethylene propylene rubber (EPR), and silicone. However, the rated voltage of unshielded PFA cable is about 2.5 kV or 3 kV, and requires circuit lengths, and therefore also cable lengths, to be shorter than those using materials with higher rated voltages (e.g., Silicone at 5 kV) but lower operating temperatures.

SUMMARY OF THE INVENTION

Embodiments of the invention overcome the aforementioned drawbacks by providing a heater cable that may be installed to heat long pipelines using as few discrete lengths of heater cable as possible, in order to maximize circuit lengths, which minimizes the number of discreet circuits needed for the pipeline. In particular, the invention provides a heater cable that can be rated at higher voltages while maintaining partial discharge at an acceptable level. The heater cable includes commonly-used materials, particularly electrical insulation materials, but is capable of withstanding a continuous applied voltage that exceeds the commonly applicable rated voltages of such materials without creating undesirable levels of partial discharge. The heater cable comprises a core conductor and an electrical insulation layer surrounding the core conductor. The heater cable further comprises an outer exposed semiconductive layer surrounding the electrical insulation layer. The semiconductive layer is in physical and electrical contact with an inner diameter of a ferromagnetic heat tube.

In one embodiment, the invention provides a skin effect heating system that includes a ferromagnetic heat tube that applies heat to a carrier pipe, and a heater cable disposed in an interior of the heat tube and cooperating with the heat tube to produce the heat and to complete an electrical circuit with a power source via skin effect. The heater cable includes a conductor, an inner semiconductive layer surrounding the conductor, an electrical insulation layer surrounding the inner semiconductive layer, and an outer semiconductive layer surrounding the electrical insulation layer and having an outer surface that contacts an inner surface of the heat tube.

In one embodiment, the outer semiconductive layer has a resistivity whereby, when an alternating current is applied to the conductor at a voltage exceeding 5 kV up to about 10 kV or 14 kV (e.g., the outer semiconductive layer is over an insulating layer of silicone), partial discharge of the heater cable does not exceed 20 nanocoulombs. In another aspect, the outer semiconductive layer has a resistivity whereby, when an alternating current is applied to the conductor at a voltage between about 2.5 kV and about 5 kV or 7 kV (e.g., the outer semiconductive layer is over an insulating layer of perfluoroalkoxy polymer (PFA)), partial discharge of the heater cable does not exceed 1 nanocoulomb, and further may not exceed 10 picocoulombs. Additionally, in any aspect, no more than an insignificant portion of a return electric current, the return electric current flowing on the inner surface of the heat tube in opposite direction to the alternating current of the conductor, is diverted to the outer semiconductive layer, such that the loss by the heat tube of the insignificant portion does not affect heat output of the heat tube. The resistivity of the outer semiconductive layer can be between $10^{-1}$ and $10^5$ ohm-cm inclusive, or more particularly between 5 and 1000 ohm-cm inclusive, and even more particularly between 5 and 50 ohm-cm inclusive. The outer semiconductive layer can be an extruded layer that is extruded onto the electrical insulation layer. Or, the outer semiconductive layer can be a semiconductive tape wrapped around the electrical insulation layer.

In another embodiment, the electrical insulation layer can be PFA that, in a typical unshielded trace heating application involving temperatures in excess of 200 deg C., has a maximum operational voltage rating (a.k.a. a "rated voltage") of about 2500 to 3000 V; the outer semiconductive layer can have a resistivity selected such that partial discharge of the heater cable does not exceed 1 nanocoulomb, and more specifically does not exceed 10 picocoulombs, when the alternating current is applied to the conductor at a voltage between 3500 and 7500 V inclusive. The outer semiconductive layer can be PFA combined with a conductive material such that the outer semiconductive layer has the desired resistivity.

In another embodiment, the invention provides a heater cable for a skin effect heating system. The heater cable includes a core conductor, an electrical insulation layer surrounding the core conductor, and an outer semiconductive layer surrounding the electrical insulation layer, the outer semiconductive layer contacting an inner surface of a ferromagnetic heat tube such that the heater cable forms an electrical circuit with the heat tube and a power source applying an alternating current to the core conductor, the electrical circuit causing skin effect heating of the heat tube. The outer semiconductive layer reduces partial discharge of the heater cable when the alternating current is applied continuously to the core conductor at a voltage exceeding 3 kV, or more particularly 3.5 kV, or even more particularly 5 kV.

In one embodiment, for a cable having a silicone insulating layer, the outer semiconductive layer can have a resistivity that limits partial discharge of the heater cable to no greater than 20 nanocoulombs, or at or below 10 picocoulombs; the outer semiconductive layer can further prevent flow of a substantial portion of an electric current flowing on the inner surface of the heat tube into the outer semiconductive layer. The outer semiconductive layer can reduce partial discharge of the heater cable when the alternating current is applied continuously to the core conductor at a voltage of 10 kV to 14 kV, inclusive. In another embodiment, for a cable having a PFA insulating layer, the outer semiconductive layer can have a resistivity that limits partial discharge of the heater cable to at most 1 nanocoulomb, or more specifically at most 10 picocoulombs while a voltage of 3.5 kV to 7.5 kV, inclusive, or more particularly 3 kV or 3.5 kV or 5 kV, is applied to the core conductor.

The outer semiconductive layer can have a resistivity between $10^{-1}$ and $10^5$ ohm-cm inclusive. The outer semiconductive layer can be affixed to the electrical insulation layer via an extrusion process, or the outer semiconductive layer can be a length of semiconductive tape wrapped around the electrical insulation layer. The heater cable can further include an inner semiconductive layer between the core conductor and the electrical insulation layer. The electrical insulation layer can be a first insulating material, and the outer semiconductive layer can be a combination or compound of the first insulating material and a first conductive material.

In yet another embodiment, the invention provides a skin effect heating system including a ferromagnetic heat tube that applies heat to a carrier pipe, and a heater cable disposed in an interior of the heat tube. The heater cable includes: a conductor; an inner semiconductive layer surrounding the conductor; an electrical insulation layer surrounding the inner semiconductive layer, the electrical insulation layer associated with an incidence of partial discharge that, when the electrical insulation layer is unshielded and is subjected to a voltage greater than a first rated voltage, exceeds a desirable maximum amount of partial discharge; and, an outer semiconductive layer surrounding and shielding the electrical insulation layer and having an outer surface that contacts an inner surface of the heat tube. The outer semiconductive layer has a resistivity that enables the heater cable to, in response to an alternating current being applied to the conductor at an applied voltage exceeding the first rated voltage, maintain an amount of partial discharge of the heater cable at or below the desirable maximum amount of partial discharge, and allow no more than an insignificant portion of a return electric current flowing on the inner surface of the heat tube in opposite direction to the alternating current of the conductor to be diverted to the outer semiconductive layer, such that the loss by the heat tube of the insignificant portion does not affect heat output of the heat tube. The resistivity of the outer semiconductive layer may be between 5 and 1000 ohm-cm inclusive. The electrical insulation layer may be perfluoroalkoxy polymer (PFA) with the first rated voltage of about 3000 volts, and the applied voltage may be between 3500 and 7500 volts, inclusive. The outer semiconductive layer may be an extruded layer of conductive PFA that is extruded onto the electrical insulation layer.

The foregoing and other aspects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

DETAILED DESCRIPTION OF THE INVENTION

Figure 1:
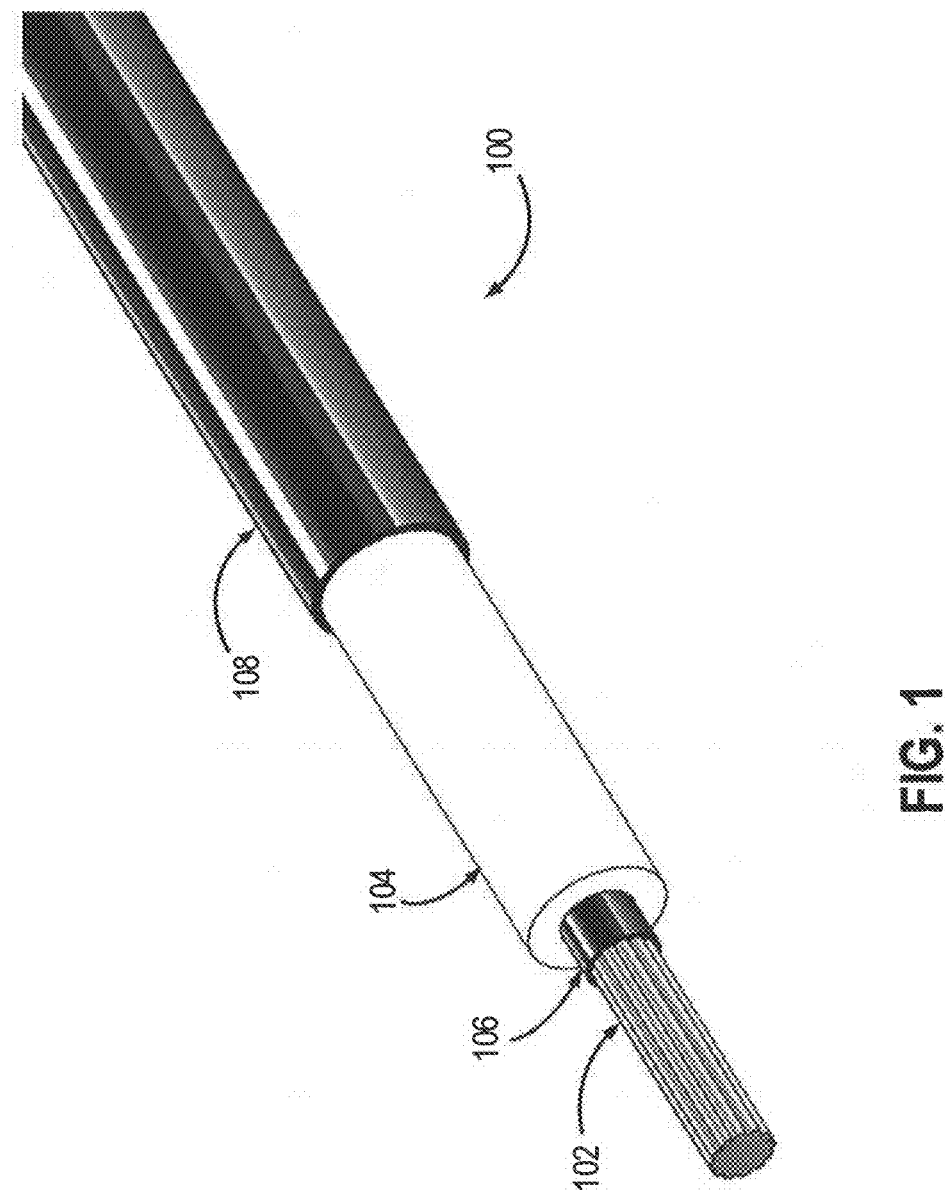
FIG. 1 is a perspective view of a heater cable in accordance with various embodiments of the invention.

FIG. 1 illustrates a heater cable 100 with each layer subsequently stripped to clearly illustrate its construction in accordance with at least one embodiment of the invention. The heater cable 100 includes a conductor 102 at its core. The conductor 102 can be of any suitable conductive material including tinned copper, nickel plated copper, aluminum, steel, gold, platinum, silver, and others. The conductor 102 may be a solid conductor wire or may be stranded wire. The conductor 102 is encapsulated within a non-conducting electrical insulation layer 104. The electrical insulation layer 104 may be of any suitable material including silicone, perfluoroalkoxy (PFA) polymer, ethylene propylene diene monomer (EPDM) rubber, ethylene propylene rubber (EPR), cross-linked polyethylene (XPLE), and others. In some embodiments, the circumference of the conductor 102 is entirely in physical contact with the electrical insulation layer 104—that is, there are no layers or other components disposed between the conductor 102 and the electrical insulation layer 104.

In other embodiments, the conductor 102 is encapsulated in or in direct electrical contact with an inner semiconductive layer 106. In these embodiments, the inner semiconductive layer 106 may be encapsulated within the electrical insulation layer 104 and further may separate the conductor 102 from the electrical insulation layer 104. The inner semiconductive layer 106 may be entirely in contact with the electrical insulation layer 104 and entirely or substantially in contact with the conductor 102. In some embodiments, the heater cable can further include a stripping layer (not shown) disposed between the conductor 102 and the semiconductive layer 106. The stripping layer facilitates clean stripping of the conductor 102—that is, no residue of the semiconductive layer 106 nor of the stripping layer is left on the conductor 102. The stripping layer may be conductive, or may be non-conductive and still allow electrical contact to be maintained between the conductor 102 and the semiconductive layer 106.

In some embodiments, a stranded conductor 102 may cause air pockets to form between the strands on the inner semiconductive layer 106 during the manufacturing process. If these air pockets are formed between the conductor 102 and the electrical insulation layer 104, they can be a source of corona partial discharge as a charge accumulates on the outer surface of the conductor 102. The inner semiconductive layer 106 may serve to neutralize or "short out" any air pockets formed at the outer surface of the conductor 102, preventing partial discharge by providing an additional conductive path to dissipate the accumulating charge and keeping a smooth interface, which provides for a smooth electric field gradient, at the semiconductor/insulation boundary. The cable 100 may additionally include a thin, conductive stripping layer (not shown) between the inner semiconductive layer 106 and the conductor 102. This layer facilitates clean stripping—that is, removal of all layers without leaving any interfering debris or residue—of the conductor 102 for connection to a terminal, a barrel crimp or another conductor.

An outer semiconductive layer 108 surrounds the electrical insulation layer 104. The outer semiconductive layer 108 may be any suitable semiconductive material, combination of semiconductive materials, or semiconductive combination of electrically insulating material(s) with conductive material(s). In some embodiments, the outer semiconductive layer 108 can be the same base material as the insulation layer 108 (e.g. silicone, PFA, etc.) but can be mixed, doped, or otherwise loaded with carbon black or another conductive material to render the layer 108 semiconductive. In particular, and as further described herein, the composition of the outer semiconductive layer 108 can be selected so that the outer semiconductive layer 108, which contacts the inner surface of the heat tube being heated, reduces or eliminates corona partial discharge without interfering with the electrical relationship between the heater cable 100 and the heat tube that enables skin effect heating. Thus, the resistivity of the material comprising the outer semiconductive layer 108 may be low enough to reduce or eliminate corona at the outer surface of the heater cable 100. In particular, the resistivity may be low enough to prevent corona discharge even at locations along the length of the heater cable 100 where the heater cable 100 is not continuously in contact with the cooperating heat tube.

Furthermore, the resistivity of the outer semiconductive layer 108 may be high enough that the return alternating current, flowing along the inner surface of a cooperating heat tube (e.g., heat tube 200 of FIG. 2) in the opposite direction to alternating current in the conductor 102, does not flow substantially into the outer semiconductive layer 108. In particular, it is understood that the heat tube's transmission of the return skin effect current may contribute more than half (typically about 70%) of the thermal energy in the skin effect trace heating system (the heater cable contributes the remainder of the thermal energy); the outer semiconductive layer 108 may have a resistivity that only allows, at most, an insignificant portion of the return current to flow into or through the outer semiconductive layer 108, so that skin effect heating of the heat tube is not disrupted. For example, the outer semiconductive layer 108 may divert less than about 1% of the return current from the inner surface of the heat tube.

In various embodiments that minimize or eliminate both corona discharge and heat loss, the bulk resistivity of the outer semiconductive layer 108 can be between $10^{-1}$ and $10^6$ ohm-cm, or between $10^0$ and $10^2$ ohm-cm, or between 5 and 50 ohm-cm, inclusive. The bulk resistivity could possibly be $10^9$ or higher in some embodiments while remaining beneficial. In another example embodiment, the heating cable 100 is intended to operate above 150 deg C. (i.e., the conductor 102 is capable of carrying a current that the cable 100 converts into thermal energy that heats the cable 100 to over 150 deg C.); the electrical insulation layer 104 is PFA, and the heater cable 100 is intended to operate at about 3500V-7500V within a carbon steel heat tube at up to 260 deg C., the outer semiconductive layer 108 can be an extrudable conductive PFA having a bulk resistivity of about 5-1000 ohm-cm. In some embodiments, the outer semiconductive layer 108 may be applied to the insulation layer 104 by a standard extrusion and/or co-extrusion process, and may have a minimum thickness of about 0.5 mm. In other embodiments, the outer semiconductive layer 108 may be applied by other methods, such as wrapping a length of semiconductive tape around the insulation layer 104 to form the outer semiconductive layer 108. A suitable semiconductive (e.g., ethylene propylene) tape may have a minimum thickness of about 0.1 mm. In any application method, the maximum suitable thickness of the outer semiconductive layer 108 is limited by cost considerations, availability of material, ease of application, and damage resistance (i.e., from being pulled through the heat tube during installation. With respect to practical considerations such as overall heater cable 100 diameter and relative diameter to the inner diameter of the heat tube in which the heater cable 100 is installed, the outer semiconductive layer thickness may have an upper limit of between 5 mm and 10 mm, inclusive.

FIGS. 2A-B illustrate the heater cable 100 installed in a heat tube 200. The core conductor 102 of the heater cable can be surrounded by an inner semiconductive layer 106, though in some embodiments the inner semiconductive layer 106 can be omitted. The insulation layer 104 then surrounds the conductor and the inner semiconductive layer 106. An outer semiconductive layer 108 surrounds the insulation layer 104. The heater cable 100 can be disposed in the interior of a heat tube 200 (not shown to scale). The heater cable 100 can be surrounded by air in the interior 202 of the heat tube 200, except at a point 204 or portion at which the outer surface 208 of the outer semiconductive layer 108 lies in contact with an inner surface 210 of the heat tube 200. When the conductor 102 and the heat tube 200 are connected to an alternating current (AC) power source 220 to form an electric circuit as described herein (i.e., with the conductor 102 connected to "hot" and the heat tube 200 connected to "neutral"), electric charge, which in the absence of the outer semiconductive layer 108 accumulates on the surface of the insulation 104 and discharges as corona (partial discharge), can now be dissipated without corona through the semiconductive layer 108 which sits in physical and electrical contact with the inner surface 210 of the heat tube 200, effectively reducing or eliminating corona and its ill effects.

The shielding of the heater cable 100 in this manner improves the application of the heater cable 100 to skin effect heating in pipeline systems, where the return alternating current is carried by the heat tube 200 and is concentrated (i.e., has the highest charge density) within a "skin depth" measured into the heat tube 200 from the inner surface 210 (the skin depth is inversely proportional to the square root of the magnetic permeability of the heat tube 200). In some embodiments, the semiconductive shielding of the heater cable 100 as described herein facilitates the use of polymeric materials that are rated to operate above 150 deg C. at voltages in excess of such materials' typical voltage ratings, which are specified to avoid corona partial discharge. For example, PFA is a suitable high-temperature material both for the electrical insulating layer 104 and, as a conductive compound, for the outer semiconductive layer 108; while unshielded PFA, as an electrical insulator, begins to experience partial discharge at about 2500-3000V, the shielded heater cable 100 as described above can use PFA in the electrical insulating layer 104 and operate at 3500V-7500V without experiencing damaging or dangerous partial discharge.

Figure 2:
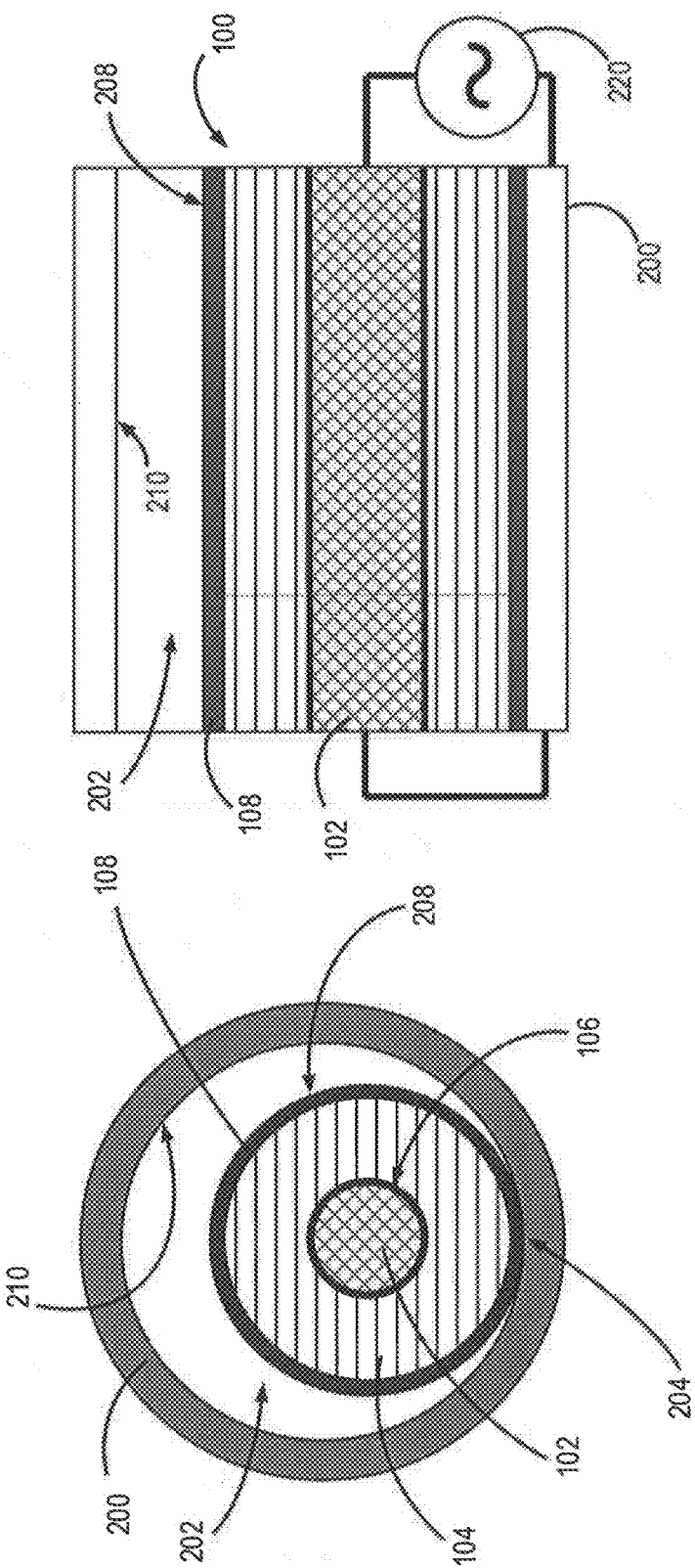
FIG. 2A is a cross-sectional front view and FIG. 2B is a cross-sectional side view illustrating positioning of the heater cable of FIG. 1 within a heat tube in accordance with various embodiments of the invention.
Figure 3:
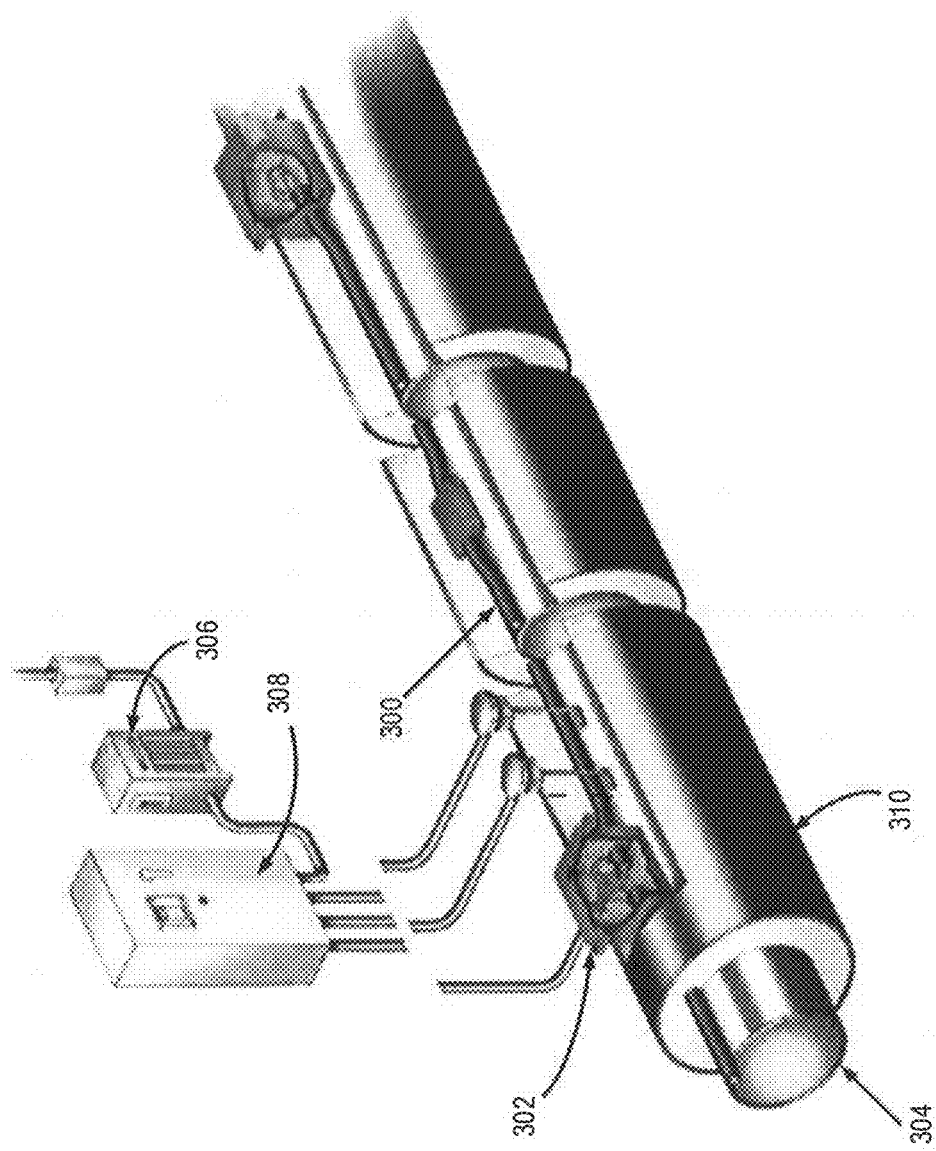
FIG. 3 illustrates the heater cable in accordance with various embodiments of the invention shown positioned in a heat tube and positioned on a carrier pipe as part of a skin effect heat tracing system.

In one skin-effect heating arrangement, as shown in FIG. 3, a ferromagnetic heat tube 300, which may be the heat tube 200 of FIG. 2, is placed against a carrier pipe 304 used for transporting oil, gas, or other heavy fluids. The semiconductive shielded heater cable of the invention lies inside the heat tube 300. Thermal insulation 310 is disposed around the carrier pipe 304 and the heat tube 300 to retain heat. A transformer 306 and control box 308 are in electrical communication with the heat tube 300 at electrical connection boxes 302. These connection boxes 302 allow individual sections or circuits of the heater cable and/or heat tube 300 to be modified, replaced, or serviced without disturbing the insulation 310. Circuit lengths are determined by a combination of cable size, cable voltage, temperature rating, heat tube size, and attachment method. It is currently feasible to heat up to 20 Kilometers (12 miles) from a single mid-point feed source using supply voltages approaching 5,000 volts for insulation materials rated up to 150C. Similarly, for insulation rated above 150C, it is possible to heat up to 6-10 kilometers from a single mid-point feed source using voltage of 2000-2500V. These circuit lengths are partially limited by the risk of arcing events, as determined by the materials and construction of the heater cables. For example, as explained above, use of commonly available PFA as an electrical insulator can limit the maximum voltage to 2500V-3000V to avoid partial discharge. In contrast, since the present skin effect heating system eliminates or mitigates charge accumulation, higher voltages (e.g., up to three times higher in a PFA-insulated heater cable) can be applied to the heater cable. Consequently, the heat tube 300 may be deployed with longer distances between line lead connections 302.

Figure 4:
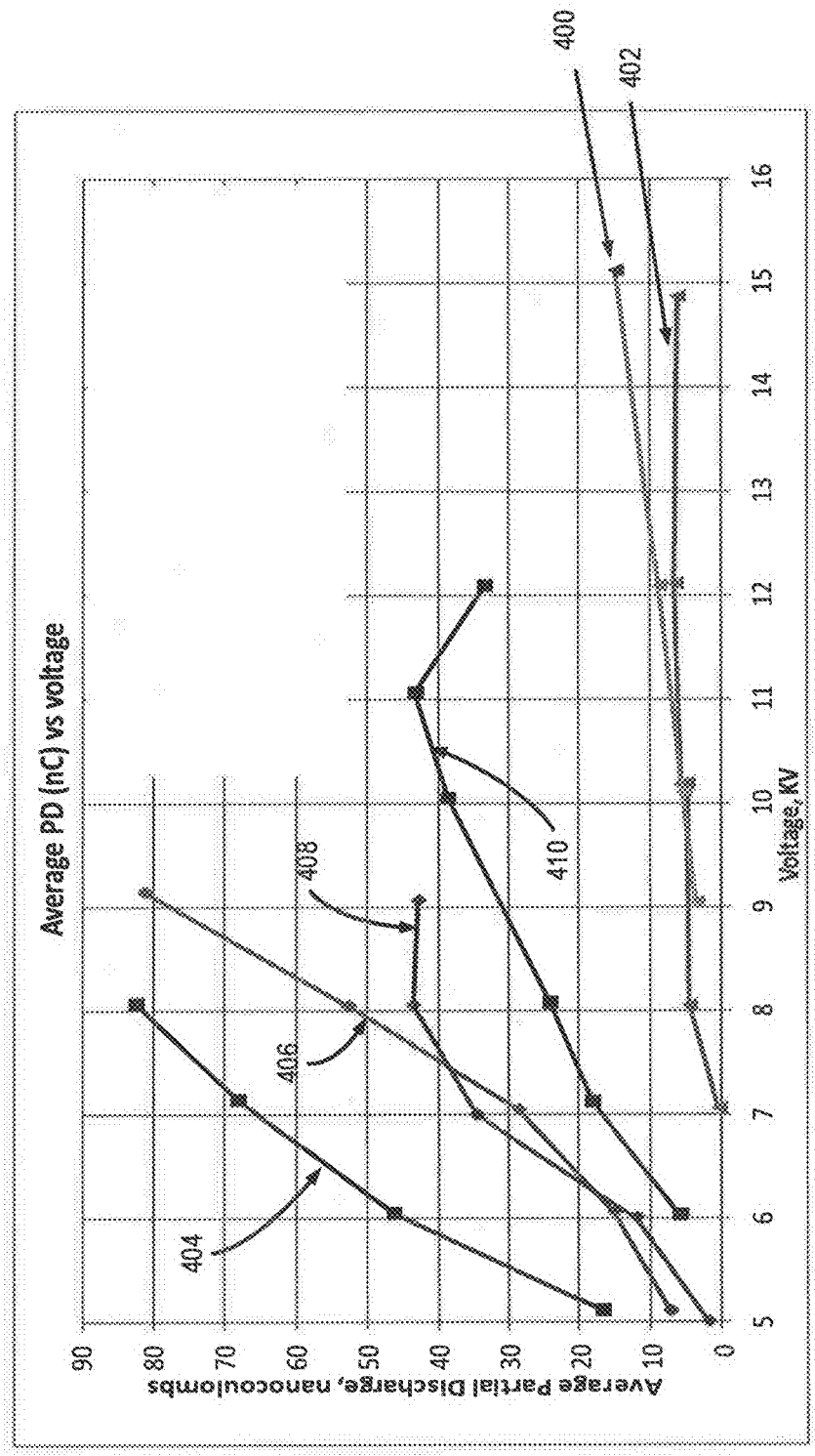
FIG. 4 is a plot of electric partial discharge vs. operating voltage for various embodiments of a heater cable having a silicone insulating layer, in accordance with the invention.

Turning now to FIG. 4, experiments were performed to verify the improved performance of semiconductive jacketed heater cables inside a heat tube according to the invention over that of traditional heater cables, without a shielding semiconductive layer, as used in the art. On the y-axis, the measure of average partial discharge in nanocoulombs is plotted against the operating voltage of the heater cable relative to the heat tube. Plots 404, 406, 408, 410 show that heat tubes with traditional unshielded heater cables for skin effect heating of the heat tube, which cables use silicone as the electrically insulating layer, experience extremely high levels of partial discharge. Thus, they are traditionally limited to operating voltages of 5 kV or less. The heater cables which use a semiconductive shielding layer according to various embodiments of the invention are plotted in plots 400, 402; in particular plot 400 shows the average partial discharge inside the heat tube using the heater cable of plot 408 modified to include the present outer semiconductive layer in accordance with an above-described embodiment. It can be seen that even at extremely high voltages, these heater cables do not experience a partial discharge above 20 nanocoulombs, and could even operate at 10 kV without a partial discharge above 10 nanocoulombs. Additional testing of disclosed embodiments of the invention has shown a partial discharge of only 50-200 picocoulombs at up to 14 kV.

With respect to the plot of FIG. 4, for a heater cable using silicone insulation, it will be understood that similar improvements, though at lower voltages, can be achieved in the above-described shielded cable using PFA as the electrically insulating layer.

The invention has been described in terms of one or more preferred embodiments, and it should be appreciated that many equivalents, alternatives, variations, and modifications, aside from those expressly stated, are possible and within the scope of the invention.

The invention claimed is:
1. A skin effect heating system comprising:
a ferromagnetic heat tube configured to apply heat to a carrier pipe; and
a heater cable disposed in an interior of the ferromagnetic heat tube, the heater cable comprising:
a conductor;
an inner semiconductive layer surrounding the conductor;
an electrical insulation layer surrounding the inner semiconductive layer, the electrical insulation layer associated with an incidence of partial discharge that, when the electrical insulation layer is unshielded and is subjected to a voltage greater than a first rated voltage, exceeds a specified maximum amount of partial discharge; and an outer semiconductive layer surrounding and shielding the electrical insulation layer and having an outer surface in electrical and direct physical contact with an inner surface of the ferromagnetic heat tube, the outer semiconductive layer having a resistivity that enables the heater cable to, in response to an alternating current being applied to the conductor at an applied voltage exceeding the first rated voltage:

maintain an amount of partial discharge of the heater cable at or below the specified maximum amount of partial discharge; and allow no more than one percent of a return electric current flowing on the inner surface of the ferromagnetic heat tube in an opposite direction to the alternating current of the conductor to flow through the outer semiconductive layer.

2. The skin effect heating system of claim 1, wherein the resistivity of the outer semiconductive layer is between 5 and 1000 ohm-cm inclusive.

3. The skin effect heating system of claim 1, wherein the electrical insulation layer is perfluoroalkoxy polymer (PFA), the first rated voltage is between 2500 and 3000 volts, inclusive, and the applied voltage is between 3500 and 7500 volts, inclusive.

4. The skin effect heating system of claim 3, wherein the outer semiconductive layer comprises an extruded layer of conductive PFA that is extruded onto the electrical insulation layer.

5. The skin effect heating system of claim 1 wherein the outer semiconductive layer comprises a semiconductive tape wrapped around the electrical insulation layer.

6. A skin effect heating system comprising:

a ferromagnetic heat tube configured to apply heat to a carrier pipe; and a heater cable comprising:

a conductor;

an electrical insulation layer surrounding at least the conductor and having a first rated voltage; and an outer semiconductive layer surrounding the electrical insulation layer, the outer semiconductive layer in electrical and direct physical contact with an inner surface of the ferromagnetic heat tube so that the heater cable forms an electrical circuit with the heat tube and a power source applying an alternating current to the conductor at a voltage exceeding the first rated voltage, the electrical circuit causing skin effect heating of the heat tube.

7. The skin effect heating system of claim 6, wherein the outer semiconductive layer has a resistivity that limits partial discharge of the heater cable at or below 1 nanocoulomb when an alternating voltage having a magnitude of up to 7500 volts is applied to the conductor.

8. The skin effect heating system of claim 6, wherein the outer semiconductive layer has a resistivity that limits partial discharge of the heater cable to at most 10 picocoulombs when an alternating voltage having a magnitude of up to 7500 volts is applied to the conductor.

9. The skin effect heating system of claim 6, wherein the outer semiconductive layer further prevents flow of an electric current having a magnitude of more than one percent of an electric current flowing on the inner surface of the heat tube from flowing through the outer semiconductive layer.

10. The skin effect heating system of claim 6, wherein the outer semiconductive layer has a resistivity between 5 and 1000 ohm-cm inclusive.

11. The skin effect heating system of claim 10, wherein the electrical insulation layer is perfluoroalkoxy polymer.

12. The skin effect heating system of claim 6, wherein the outer semiconductive layer is affixed to the electrical insulation layer via an extrusion process.

13. The skin effect heating system of claim 6, wherein the outer semiconductive layer comprises a length of semiconductive tape wrapped around the electrical insulation layer.

14. The skin effect heating system of claim 6, wherein the heater cable further comprises an inner semiconductive layer between the conductor and the electrical insulation layer.

15. The skin effect heating system of claim 6, wherein the electrical insulation layer comprises a first insulating material and the outer semiconductive layer comprises the first insulating material and a first conductive material.

16. The skin effect heating system of claim 15, wherein the first insulating material is perfluoroalkoxy polymer.

17. The skin effect heating system of claim 16, wherein the first conductive material is selected so that the outer semiconductive layer has a resistivity between 5 and 1000 ohm-cm inclusive.

18. The skin effect heating system of claim 6, wherein the first rated voltage corresponds to a maximum unshielded operating voltage of between 2500 and 3000 volts.

* * * * *

UNITED STATES PATENT AND TRADEMARK OFFICE
CERTIFICATE OF CORRECTION

| | |
|---|---|
| PATENT NO. | : 11,006,484 B2 |
| APPLICATION NO. | : 15/902804 |
| DATED | : May 11, 2021 |
| INVENTOR(S) | : Wesley Dong et al. |

It is certified that error appears in the above-identified patent and that said Letters Patent is hereby corrected as shown below:

In the Specification

Column 2, Lines 9-10, "nanoCoulornbs" should read -- nanoCoulombs --.

Signed and Sealed this
Tenth Day of August, 2021

Drew Hirshfeld
*Performing the Functions and Duties of the
Under Secretary of Commerce for Intellectual Property and
Director of the United States Patent and Trademark Office*